United States Patent Office 3,360,527
Patented Dec. 26, 1967

3,360,527
VINYLPENICILLINS
Takayuki Naito, Susumu Nakagawa, and Jun Okumura, Tokyo, Japan, assignors to Bristol-Banyu Research Institute, Ltd., Tokyo, Japan, a corporation of Japan
No Drawing. Filed May 3, 1966, Ser. No. 547,169
5 Claims. (Cl. 260—306.7)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by gram-positive bacteria and, more particularly, relates to 6-($\beta$-acylvinylamino) penicillanic acids and nontoxic salts thereof.

Antibacterial agents such as benzylpenicillin have proved highly effective in the past in the therapy of infections due to gram-positive bacteria but such agents suffer from the serious drawbacks of being unstable in aqueous acid, e.g. upon oral administration, and of being ineffective against numerous so-called resistant strains of bacteria, e.g. penicillin-resistant strains of Staphlococcus aureus (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or penicillinase or are effective against benzylpenicillin resistant strains of bacteria or inhibit benzylpenicillinase and thus potentiate the action of benzylpencillin when admixed therewith and are safe for use in patients who cannot be given benzylpenicillin because they exhibit allergic reactions thereto.

There is provided according to the present invention a new class of compounds which are 6-($\beta$-acylvinylamino) penicillanic acids and nontoxic salts thereof. Such compounds may be represented by the general formula $$\underset{\text{O}}{\overset{\text{O}}{\text{R}-\text{C}}}-\text{CH}=\text{CR}^1-\text{NH}-\text{CH}-\text{CH} \overset{\text{S}}{\underset{\text{N}}{\diagup\diagdown}} \overset{\text{CH}_3}{\underset{\text{CHCOOH}}{\text{C}-\text{CH}_3}} \quad (I)$$

$$\text{O}=\text{C}-\text{N}-\text{CHCOOH}$$

wherein R represents a member selected from the group comprising aromatic, heterocyclic, aliphatic and carboalkoxyaliphatic groups having from one to twenty carbon atoms inclusive and wherein $R^1$ represents a member selected from the group comprising hydrogen, (lower)alkyl, aromatic, and heterocyclic groups having from one to ten carbon atoms inclusive; and nontoxic salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-betaphenethylamine, 1-ephenamine, N,N'-dibenzylethylenediamine, dehydroabietylamine, N,N'-bis-dehydroabietylethylene diamine, and other amines which have been used to form salts with benzylpenicillin. Also included within the scope of the present invention are easily hydrolyzed esters which are converted to the free acid form by chemical or enzymatic hydrolysis.

Preferred embodiments of the present invention are the series of compounds having the following formulae:

$$R^2-\overset{\text{O}}{\text{C}}-\text{CH}=\text{CR}^3-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

wherein $R^2$ represents (lower)alkyl and $R^3$ represents hydrogen or (lower)alkyl;

$$R^4-\overset{\text{O}}{\text{C}}-\text{CH}=\text{CR}^5-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

wherein $R^4$ represents halo(lower)alkyl and $R^5$ represents hydrogen, (lower)alkyl, thienyl or furyl;

$$R^6-\overset{\text{O}}{\text{C}}-\text{CH}=\text{CR}^7-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

wherein $R^6$ represents carboalkoxy and $R^7$ represents hydrogen or (lower)alkyl;

$$R^8-\overset{\text{O}}{\text{C}}-\text{CH}=\text{CR}^9-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

wherein $R^8$ represents an aromatic group and $R^9$ represents hydrogen or (lower)alkyl;

$$R^{10}-\overset{\text{O}}{\text{C}}-\text{CH}=\text{CR}^{11}-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

wherein $R^{10}$ represents thienyl, furyl or 5-alkyl-3-aryl-4-isoxazolyl; $R^{11}$ represents hydrogen or (lower)alkyl; and pharmaceutically acceptable salts thereof.

Preferred compounds of the present invention are those of the formulae $$R^2-\overset{\text{O}}{\text{C}}-\text{CH}=\text{CR}^3-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

$$R^4-\overset{\text{O}}{\text{C}}-\text{CH}=\text{CR}^5-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

$$R^6-\overset{\text{O}}{\text{C}}-\text{CH}=\text{CR}^7-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

$$R^8-\overset{\text{O}}{\text{C}}-\text{CH}=\text{CR}^9-\text{NH}-\text{CH}-\text{CH} \overset{\text{S}}{\diagup\diagdown} \overset{\text{CH}_3}{\text{C}-\text{CH}_3}$$
$$\text{C}-\text{N}-\text{CHCOOH}$$

$$R^{10}-\overset{\text{O}}{\text{C}}-\text{CH}=\text{CR}^{11}-\text{NH}-\text{CH}-\text{CH} \overset{\text{S}}{\diagup\diagdown} \overset{\text{CH}_3}{\text{C}-\text{CH}_3}$$
$$\text{O}=\text{C}-\text{N}-\text{CHCOOH}$$

and the pharmaceutically acceptable salts thereof wherein $R^2$ represents a member selected from the group consisting of methyl, ethyl, propyl, isopropyl, butyl, isobutyl, amyl, nonyl; $R^3$ represents hydrogen; $R^4$ represents a member selected from the group consisting of chloromethyl, chloroethyl and trifluoromethyl; $R^5$ represents a member selected from the group consisting of hydrogen, methyl, thienyl and furyl; $R^6$ represents carbomethoxyethyl; $R^7$ represents hydrogen; $R^8$ represents a member selected from the group consisting of phenyl, o-chlorophenyl, p-chlorophenyl, o-bromophenyl, p-nitrophenyl, p-methoxyphenyl, benzyl, and phenoxyethyl; $R^9$ represents hydrogen; $R^{10}$ represents a member selected from the group consisting of thienyl, furyl and 5-methyl-3-phenyl-4-isoxazolyl; and $R^{11}$ represents hydrogen.

The new compounds of the present invention are prepared by the reaction of 6-aminopenicillanic acid with an acylacetylene compound having the formula $$R-\overset{\text{O}}{\text{C}}-\text{C}\equiv\text{CH} \quad (II)$$

or by the condensation of 6-aminopenicillanic acid with an acylvinylhalide having the formula

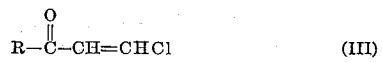     (III)

wherein R in each of Formulae II and III is defined above in accordance with the definition of Formula I.

Thus, an excellent procedure for preparing the compounds of Formula I by way of reaction of 6-aminopenicillanic acid and a compound of Formula II comprises adding, to a mixture of 6-aminopenicillanic acid, a hydrocarbylamine and an alkylene halide, a solution of an equivalent amount of an acylacetylene in an alkylene halide at a temperature of about 5° C. The temperature may then be elevated to about 10–20° C. and the reaction is allowed to take place. The reaction mixture is then extracted according to known methods to isolate the product as the salt of the 6-($\beta$-acylvinylamino) penicillanic acid.

A further excellent procedure for preparing the compounds of Formula I is by condensation of 6-aminopenicillanic acid with a compound of Formula III which comprises adding, to a solution of 6-aminopenicillanic acid in a hydrocarbylamine and an alkylene halide, an equivalent amount of an acylvinyl halide at a temperature of about 0–10° C. The reaction mixture is then raised to 10–25° C. and the reaction proceeds. The product, as the salt of the 6-($\beta$-acylvinylamino) penicillanic acid is recovered by standard extraction and recovery procedures. For example, upon extraction with water the aqueous extracts may be covered with ethylacetate, acidified and extracted with ethylacetate. The organic extracts may then be combined, washed with water, dried and precipitated by addition of SEH (sodium 2-ethylhexanoate) solution. The precipitate may then be collected by filtration, washed with ether and dried.

A further method of preparation of the compounds of Formula I is by the mixed anhydride method which comprises adding, to an alkylformate or alkylhaloformate and a ketone or aliphatic amine, an appropriate acid or derivative thereof in an anhydrous, inert and preferably water-miscible solvent such as dioxane and if desired a small amount of acetone for about thirty minutes in the cold, e.g. about 4° C. To this mixed anhydride solution there is added equivalent amounts of 6-aminopenicillanic acid and an aliphatic amine in water. The mixture is then stirred for about one hour at room temperature to obtain the desired product.

The following examples will serve to more fully illustrate preferred specific embodiments of the present invention but are not to be construed as a limitation thereof. In the examples, Part A will illustrate preparation of starting materials and intermediates and Part B will illustrate the preparation of the novel 6-$\beta$-acylvinylamino penicillanic acids or salts thereof.

EXAMPLE 1

*Preparation of the sodium salt of 6-($\beta$-butylrylvinyl-amino)penicillanic acid*

PART A $\beta$-Butyrylvinyl chloride.—A stirred suspension of 146 g. (1.1 moles) of anhydrous aluminum chloride in 300 ml. of carbon tetrachloride was cooled to 0° C. and 120.5 g. (0.1 mole) of n-butyryl chloride were added dropwise to form a homogeneous solution. The mixture was cooled to $-5°$ C. and acetylene gas was vigorously passed into the mixture. The reaction was started and in 10–20 minutes the temperature of the reaction mixture rose to 0–2° C. After two hours, the mixture was poured into a mixture of 500 g. of crushed ice and 20 g. of sodium chloride and extracted three times with 100 ml. of ether. The ethereal extracts were washed with a saturated solution of sodium chloride, dried over anhydrous sodium sulfate and distilled under reduced pressure. $\beta$-Butyrylvinyl chloride weighed 79 g. (52%). B.P. 64° C./17 mm.

PART B

An amount of 10 ml. of triethylamine was added to a suspension of 5 g. (0.025 mole) of 6-aminopenicillanic acid in 80 ml. of methylene chloride and the mixture was stirred at room temperature for half an hour to obtain a clear solution. The 6-aminopenicillanic acid solution was cooled below 5° C. and a solution of 6 g. (0.045 mole) of $\beta$-butyrylvinyl chloride was added dropwise. The reaction mixture was stirred at 25° C. for five hours and then extracted twice with 100 ml. of cold water. The cold, stirred aqueous extracts were covered with 100 ml. of ethyl acetate and acidified to pH 2 with dil. hydrochloric acid. The aqueous layer was again extracted with two 100-ml. portions of ethyl acetate. The combined organic extracts were washed with cold water, dried over anhydrous sodium sulfate and 37% SEH solution was added to the filtrate to deposit a white precipitate, which was collected by filtration, washed with ether and dried in vacuo. Sodium 6-($\beta$-butyrylvinylamino)penicillanate weighed 4 g. (48%), had a molecular weight of 334.38 and was found to inhibit *Staph. aureus* Smith at a concentration of 0.195–0.391 mcg./mg. and to exhibit versus *Staph. aureus* Smith, upon intramuscular injection in mice, a $CD_{50}$ of 2.5 mg./kg.

EXAMPLE 2

In the general procedure of Example 1, the $\beta$-butyrylvinyl chloride was replaced by 0.045 mole of $\beta$-caproylvinyl chloride,
$\beta$-propionylvinyl chloride,
$\beta$-acetylvinyl chloride,
$\beta$-valerylvinyl chloride and
$\beta$-caprylylvinyl chloride, respectively, to produce the acids (a) 6-($\beta$-caproylvinylamino)penicillanic acid,
(b) 6-($\beta$-propionylvinylamino)penicillanic acid,
(c) 6-($\beta$-acetylvinylamino)penicillanic acid,
(d) 6-($\beta$-valerylvinylamino)penicillanic acid and
(e) 6-($\beta$-caprylylvinylamino)penicillanic acid, respectively, which were isolated as their water-soluble sodium salts and which were found to inhibit *Staph. aureus* Smith at the following concentrations:

(a) 0.78 mcg./mg.
(b) 3.13–6.25 mcg./mg.
(c) 12.5 mcg./mg.
(d) 0.2–0.4 mcg./mg.
(e) 0.001 percent by weight

EXAMPLE 3

*Preparation of the sodium salt of 6-($\beta$-isobutyryl-vinylamino) penicillanic acid*

PART A

*Isopropylethinylcarbinol.* — Purified, dried acetylene was rapidly passed into about 1000 ml. of liquid ammonia with stirring and cooling, and 23 g. of sodium added in small pieces in such a manner that the blue colour never persisted for more than a few minutes. A solution of 72 g. (1 mole) of isobutylaldehyde in 100 ml. of dry ether was then added during an hour, and the mixture stirred and cooled for an additional hour with continued introduction of acetylene. The ammonia was allowed to evaporate overnight. The reaction mixture was added to ice water, then acidified with dilute sulfuric acid, and extracted with ether. The ether extracts were separated, dried with anhydrous sodium sulfate. Distillation gave 63.5 g. (65%) of isopropylethinylcarbinol. B.P. 132–134° C.

*Isobutyrylacetylene.*—To a stirred solution of 60.0 g. (0.612 mole) of isopropylethinylcarbinol in 120 ml. of acetone was slowly added a mixture of 42.2 g. of chromium trioxide, 129 ml. of water and 35.2 ml. of conc. sulfuric acid at 5° C. during 2 hours. After stirring for 30 minutes, the mixture was diluted with ice and water to give the product as an oil. The oily ketone was extracted with ether and the extracts dried with anhydrous sodium sulfate. The solvent was removed and the residue was distilled under reduced pressure to give 38.0 g. (65%) of isobutyrylacetylene. B.P. 45–46° C./42 mm.

*Isobutylaldehyde.*—To 140 g. (1.89 moles) of tertiary butyl alcohol which was kept at 70–80° C. was added dropwise 310 g. (1.94 moles) of bromine with stirring at such a rate that no unreacted bromine accumulated. The reaction mixture separated into two layers. The layer which contained 1,2-dibromo-2-methylpropane was separated and hydrolyzed by heating with 1.8 l. of water in a flask equipped with a 60 x 1.5 cm. packed column. At first heat was applied to give refluxing without any distillation. Later the heat was increased to distill off the isobutylaldehyde as formed (58–65° C. at the top of the column). Then, the dibromide layer was distilled through an efficient column to give 80 g. (59%) of isobutylaldehyde boiling at 57–66° C.

PART B

To a mixture of 4.3 g. (0.02 mole) of 6-aminopenicillanic acid, 2.1 g. (0.021 mole) of triethylamine and 40 ml. of absolute methylene chloride was slowly added to a solution of 1.92 g. (0.02 mole) of isobutyrylacetylene in 10 ml. of absolute methylene chloride at 5° C. with stirring. After stirring for about 18 hours at 10–20° C., the reaction mixture was extracted with five 50 ml. portions of aqueous sodium bicarbonate solution and the combined extracts were washed with 50 ml. of ether, covered with 50 ml. of cold ethyl acetate and acidified with 10% sulfuric acid under cooling. The aqueous layer was extracted with additional 50 ml. of ethyl acetate. The combined organic layer was washed with 50 ml. of cold water, dried with anhydrous sodium sulfate and then calcium chloride. To the filtrate was added about 6 ml. of 35% SEH solution to give the precipitate, which was filtered and dried in vacuo. Yield of sodium 6-(β-isobutyrylvinylamino) penicillanate was 808 mg. (12.5%). M.P. 219–221° C. (dec.).

*Analysis.*—Calcd. for $C_{14}H_{19}N_2O_4SNa \cdot H_2O$: C, 47.71; H, 6.01; N, 7.95. Found: C, 47.11, 46.96; H, 6.26, 6.39; N, 8.27, 8.68.

The product inhibited *Staph. aureus* Smith at a concentration of 1.6–3.1 mcg./mg. and was found to exhibit versus *Staph. aureus* Smith, upon intramuscular injection in mice, a $CD_{50}$ of 40 mg./kg.

Alternatively, the product may be prepared as follows:

PART A

*Isobutylryl chloride.*—To 63 g. (0.72 mole) of isobutyric acid was added 84 g. (0.72 mole) of thionyl chloride at room temperature and the mixture was allowed to stand overnight. The next day it was refluxed for one hour and distilled under ordinary pressure to give 57 g. (75%) of isobutyryl chloride boiling at 94–105° C.

$\nu C=O$ 1810, 1785 cm.$^{-1}$

*β-chlorovinyl isopropyl ketone.*—To a suspension of 44 g. (0.33 mole) of anhydrous aluminum chloride in 150 ml. of carbon tetrachloride was added 32 g. (0.3 mole) of isobutyryl chloride at 0–5° C. Acetylene gas was led to the stirred cold mixture for two hours. The reaction product was poured into ice-water and extracted three times with 100 ml. of ether. The ethereal extracts were washed with 100 ml. of saturated sodium chloride solution and dried over anhydrous sodium sulfate. The solvent was evaporated and the residue was distilled under diminished pressure to give 25 g. (63%) of β-chlorovinyl isopropyl ketone boiling at 59–61° C./ 21 mm. $\nu_{max.}^{liq.}$ 1790 cm.$^{-1}$ (C=O), 1590 cm.$^{-1}$ (C=C), 940 cm.$^{-1}$ trans, =C—H). $\lambda_{max.}^{EtOH}$ 231 m$\mu$ ($\epsilon$ 8,100)

PART B

A mixture of 11 g. (0.05 mole) of 6-aminopenicillanic acid and 10 g. (0.1 mole) of triethylamine in 100 ml. of dry methylene chloride was stirred at room temperature for half an hour to become an almost clear solution. A solution of 7 g. (0.05 mole) of β-chlorovinyl isopropyl ketone in 10 ml. of dry methylene chloride was added dropwise over a period of 20 minutes to the stirred 6-aminopenicillanic acid solution. The mixture was stirred at 25° C. for 4 hours and extracted three times with cold water containing a small amount of sodium bicarbonate. The extracts were washed with two 200-ml. portions of ether, covered with 100 ml. of ethyl acetate and acidified to pH 2 with hydrochloric acid below 5° C. under vigorous stirring. The aqueous layer combined with the extracts was washed twice with 50 ml. of cold water and dried over anhydrous sodium sulfate and calcium chloride. The dried filtrate was mixed with 5 ml. of 36% SEH solution and concentrated to about 20 ml. under reduced pressure below 40° C. The resulting concentrate was poured into 300 ml. of dry ether to precipitate 5.2 g. (31%) of sodium 6-(β-isobutyrylvinylamino) penicillanate.

EXAMPLE 4

*Preparation of the sodium salt of 6-(β-isovalerylvinylamino) penicillanic acid*

PART A

*β-chlorovinyl isobutyl ketone.*—Isovaleryl chloride (60 g., 0.5 mole) was added dropwise at 0–5° C. to a stirred suspension of 73 g. (0.55 mole) of anhydrous aluminum chloride in 150 ml. of carbon tetrachloride. The mixture was cooled to −10° C. and acetylene gas was vigorously passed into the mixture for three hours. The reaction mixture was poured onto crushed ice and extracted three times with 100 ml. of ether. The ethereal extracts were washed with a saturated sodium chloride solution, dried over anhydrous sodium sulfate and distilled under diminished pressure to give 41 g. (56%) of β-chlorovinyl isobutyl ketone boiling at 72–78° C./19–20 mm.

PART B

A mixture of 11 g. (0.05 mole) of 6-aminopenicillanic acid, 10 g. (0.1 mole) of triethylamine and 100 ml. of dry methylene chloride was stirred at room temperature for ½ hour to obtain a clear solution and then cooled below 5° C. A solution of 8 g. (0.05 mole) of β-chlorovinyl isobutyl ketone in 20 ml. of dry methylene chloride was added dropwise to the stirred 6-aminopenicillanic acid solution. The mixture was stirred at room temperature for 5 hours and extracted three times with cold water containing a small amount of sodium bicarbonate (100 ml., 50 ml., 50 ml.). The aqueous extracts were washed twice with 200 ml. of ether, covered with 100 ml. of ethyl acetate and acidified to pH 2 below 5° C. with 10% HCl. The aqueous layer was again extracted with 100 ml. of ethyl acetate. The combined ethyl acetate extracts were washed twice with 50 ml. of cold water, dried with anhydrous sodium sulfate and then calcium chloride. There was added 1 ml. of 35% SEH solution to the filtrate, the mixture was concentrated to about 20 ml. below 40° C. and to the concentrate was added 200 ml. of dry ether to give 1.3 g. (7.5%) of sodium 6-(β-isovalerylvinylamino) penicillanate of mol. wgt. 348.42. The product inhibited *Staph. aureus* Smith at a concentration of 3.1 mcg./mg. and was found to exhibit versus *Staph. aureus* Smith, upon IM injection in mice, a $CD_{50}$ of 18.5 mg./kg.

EXAMPLE 5

*Preparation of the sodium salt of 6-(β-chloroacetylvinylamino) penicillanic acid*

PART A

*Chloroacetyl chloride.*—A mixture of 94.5 g. (1.0 mole) of monochloroacetic acid and 200 ml. of thionyl chloride was heated under reflux for 22 hours. The reaction mixture was distilled with Widmer's column to give 60 g. (53%) of chloroacetyl chloride. B.P. 91–105° C.

*β-chlorovinyl chloromethyl ketone.*—To a cold suspension of 78 g. (0.58 mole) of aluminum chloride in 160 ml. of carbon tetrachloride was added dropwise 60 g. (0.53 mole) of chloroacetyl chloride under stirring. The mixture was cooled at −5° C. and acetylene gas was led to the mixture for two hours. The temperature of the reaction mixture reached to 30–45° C. The mixture was poured into 1 l. of ice-water. The carbon tetrachloride layer was separated, washed with cold water and dried over anhydrous sodium sulfate. The solvent was evaporated and the residue was distilled under diminished pressure to give 45 g. (62%) of β-chlorovinyl chloromethyl ketone boiling at 78–83° C./16 mm.

PART B

A mixture of 22 g. (0.1 mole) of 6-aminopenicillanic acid and 28 ml. (0.2 mole) of triethylamine in 200 ml. of dry methylene chloride was stirred at room temperature to obtain a clear solution. A solution of 14 g. (0.1 mole) of β-chlorovinyl chloromethyl ketone in 30 ml. of dry methylene chloride was added dropwise at about 10° C. to the stirred 6-aminopenicillanic acid solution. After the addition was completed, the mixture was stirred for 3 hours at room temperature. The reaction mixture was extracted twice with 150 ml. of cold water. The combined extracts were washed with 100 ml. of ether, covered with 150 ml. of ether and acidified to pH 2 with 35% sulfuric acid below 5° C. under stirring. The aqueous layer was again extracted with 100 ml. of ether. The organic layer was combined with the ethereal extract, washed with 100 ml. of cold water and dried over anhydrous sodium sulfate. To the dried filtrate was added 2 ml. of 36% SEH solution to give 1 g. (3%) of sodium 6-(β-chloroacetylvinylamino)penicillanate, MW 340.77. The product inhibited *Staph. aureus* Smith at concentrations of 3.1–6.3 mcg./mg.

EXAMPLE 6

*Preparation of the sodium salt of 6-(β-chloropropionylvinylamino)penicillanic acid*

In the manner described in Example 5, sodium 6-(β-chloropropionylvinylamino)penicillanate was prepared by substituting β-chlorovinyl-α-chloroethyl ketone for β-chlorovinyl chloromethyl ketone. An amount of 7 g. (39%) of the product was obtained, MW 354.82. The compound inhibited *Staph. aureus* Smith at concentrations of 3.1–6.3 mcg./mg.

EXAMPLE 7

*Preparation of the sodium salt of 6-(α-methyl-β-trifluoroacetylvinylamino)penicillanic acid*

Ethyl chloroformate (2.1 g., 0.02 mole) was added to a solution of 3.08 g. (0.02 mole) of trifluoroacetyl acetone and 2.0 g. (0.02 mole) of triethylamine in 40 ml. of dry dioxane and 5 ml. of dry acetone with stirring at 0–5° C., and the mixture was stirred for 15 hours at room temperature.

A solution of 4.2 g. (0.02 mole) of 6-aminopenicillanic acid and 2.0 g. (0.02 mole) of triethylamine in 6 ml. of water was added in one portion to the mixed anhydried solution at 0–5° C. and the mixture was stirred for one hour at room temperature. The reaction mixture was extracted twice with 50 ml. of ether under weak alkaline condition by adding 1.6 g. of sodium bicarbonate, and the ethereal extracts were discarded. The aqueous layer was chilled below 5° C., covered with 60 ml. of ether and acidified to pH 2 with dil. sulfuric acid under stirring. The aqueous layer was again extracted with additional 120 ml. of ether and the extracts were combined with the ethereal layer. The ethereal solution was washed with cold water, dried with anhydrous sodium sulfate, then calcium chloride, and 10 ml. of 39% SEH solution and 300 ml. of petroleum ether were added to give 2.7 g. (36.2%) of sodium 6-(β-trifluoroacetyl-α-methylvinylamino)penicillanate having a mol. wgt. of 374.32. The product inhibited *Staph. aureus* Smith at a concentration of 12.5 mcg./mg. and exhibited versus *Staph. aureus* Smith, upon IM injection in mice, a $CD_{50}$ of 12.5 mg./kg.

EXAMPLE 8

*Preparation of the sodium salt of 6-[α-(2-thienyl)-β-trifluoroacetylvinylamino]penicillanic acid*

Ethyl chloroformate (2.1 g., 0.02 mole) was added to a solution of 4.44 g. (0.02 mole) of 2-thenoyltrifluoroacetone, 2.0 g. (0.02 mole) of triethylamine in 40 ml. of dry dioxane and 20 ml. of dry acetone with stirring at 0–5° C., and the mixture was stirred for 5 hours at room temperature. A solution of 4.2 g. (0.02 mole) of 6-aminopenicillanic acid and 2.0 g. (0.02 mole) of triethylamine in 6 ml. of water was added in one portion to the mixed anhydried solution at 0–5° C. and the mixture was stirred for 1 hour at room temperature. The reaction mixture was washed with 50 ml. of ether under weak alkaline condition by adding 1.6 g. of sodium bicarbonate. The aqueous layer was covered with 60 ml. of ether and acidified to pH 2 with dil. sulfuric acid in the cold. The aqueous layer was extracted with additional 120 ml. of ether and the extracts were combined with the ether layer. The ethereal solution was washed with cold water, dried over anhydrous sodium sulfate, then calcium chloride, and 9 ml. of 39% SEH solution and 200 ml. of petroleum ether were added to give 2.9 g. (32.8%) of sodium 6-(β-trifluoroacetyl-α-2-thienylvinylamino)penicillanate, MW 442.42. The product inhibited *Staph. aureus* Smith at a concentration of 12.5 mcg./mg. and exhibited, versus *Staph. aureus* Smith (IM injection in mice), a $CD_{50}$ of 10 mg./kg.

EXAMPLE 9

*Preparation of the sodium salt of 6-[α-(2-furyl)-β-trifluoroacetylvinylamino]penicillanic acid*

To a stirred mixture of 5 g. (0.0243 mole) of 2-furoyltrifluoroacetone and 2.46 g. (0.0243 mole) of triethylamine in 30 ml. of dried dioxane and 20 ml. of dried acetone was slowly added 2.63 g. (0.0243 mole) of ethyl chloroformate under cooling and the mixture was then allowed to stand overnight at room temperature. To the stirred reaction mixture was added at once a 6-aminopenicillanic acid solution at 0–5° C. which consisted of 5.25 g. (0.0243 mole) of 6-aminopenicillanic acid, 2.46 g. (0.0243 mole) of triethylamine and 6 ml. of water. After stirring for 1.5 hours at room temperature the reaction mixture was added with 2.2 g. (0.025 mole) of sodium bicarbonate in 100 ml. of water under cooling and the mixture was extracted with two 30-ml. of ethyl acetate and acidified with dil. sulfuric acid under stirring. The aqueous layer was extracted with additional 200 ml. of ethyl acetate. The combined organic layers were washed with 50 ml. of cold water and dried with anhydrous sodium sulfate, then calcium chloride. After an addition of 10 ml. of 39% SEH solution in butanol the reaction mixture was concentrated to one third of the volume and diluted with 500 ml. of petroleum ether to give 4.8 g. (45%) of sodium 6-(α-furyl-β-trifluoroacetylvinylamino)penicillanate. The product had a molecular weight of 436.34 and inhibited *Staph. aureus* Smith at a concentration of 12.5 mcg./mg. It exhibited a $CD_{50}$ (*Staph. aureus* Smith, IM, mice) of 7.9 mg./kg.

EXAMPLE 10

*Preparation of the sodium salt of 6-(5-carbomethoxy-3-oxo-1-pentenylamino)penicillanic acid*

PART A

*β-Chlorovinyl β-carbomethoxyethyl ketone.*—To a suspension of 85 g. (0.64 mole, two equivalents) of aluminum chloride in 150 ml. of dichloroethane was added dropwise 46 g. (0.3 mole) of β-carbomethoxypropionyl chloride. The mixture was cooled to 0° C. and acetylene gas was passed into the mixture for 2 hours. The reaction mixture was poured into a dilute hydrochloric acid and extracted three times with 50 ml. of ether. The ethereal extracts were washed with a saturated solution of sodium chloride dried over anhydrous sodium sulfate and distilled under reduced pressure to give 31 g. (58%) of β-chlorovinyl-β-carbomethoxyethyl ketone.

PART B

A mixture of 11 g. (0.05 mole) of 6-aminopenicillanic acid, 10 g. (0.10 mole) of triethylamine and 100 ml. of dry methylene chloride was stirred for half an hour until a clear solution was obtained. A solution of 9 g. (0.05 mole) of β-chlorovinyl-β-carbomethoxyethyl ketone in 20 ml. of dry methylene chloride was added dropwise to the 6-aminopenicillanic acid solution. The mixture was stirred for 4 hours at room temperature. The reaction mixture was extracted three times with 50 ml. of cold water washed twice with 200 ml. of ether, covered with 100 ml. of ethyl acetate and acidified to pH 2 with hydrochloric acid under stirring in a cold. The aqueous layer was separated and again extracted twice with 100 ml. of ethyl acetate. The ethyl acetate layer combined with the organic extracts was washed with cold water, dried over anhydrous sodium sulfate and then calcium chloride. Addition of 5 ml. of 36% SEH solution to the filtrate gave white precipitate, which was separated by decantation and triturated with ether to give 2 g. (10%) of the 6-aminopenicillanic acid derivative. The supernatant was concentrated and poured into 200 ml. of dry ether to give 7 g. (37%) of the subject product, MW 378.41. The compound inhibited *Staph. aureus* Smith at a concentration of 3.1 mcg./mg.

EXAMPLE 11

*Preparation of the sodium salt of 6-(β-benzoylvinylamino) penicillanic acid*

PART A

*Phenylethinylcarbinol.*—Acetylene gas was passed into 1000 ml. of liquid ammonia with stirring, while 23 g. of sodium was added slowly in 1 g. portions. A solution of 106 g. (1 mole) of benzaldehyde in 100 ml. of dry ether was added over a period of one hour and the mixture was stirred and cooled for two hours with continuous introduction of acetylene. The reaction mixture was allowed to stand overnight to evaporate the ammonia and to the residue was added dil. sulfuric acid containing ice. The aqueous solution was extracted with ether, the extracts being dried and evaporated. The residual oil was distilled under diminished pressure to give 98 g. (74%) of phenylethinylcarbinol boiling at 125–127° C./18 mm.

*Benzoylacetylene.*—To a solution of 98 g. (0.74 mole) of phenylethinylcarbinol in 200 ml. of acetone was added dropwise a solution of 50 g. of chromium trioxide in 150 ml. of water containing 43 ml. of conc. sulfuric acid. The temperature was kept below 10° C. during the addition. After the addition was completed the mixture was stirred at room temperature for 2 hours, then poured onto 1 kg. of crushed ice. The precipitate which separated was collected by filtration and washed with water. Recrystallization from water-ethanol gave pale yellow needles melting at 47–48° C. Yield 80%.

PART B

A mixture of 4.3 g. (0.02 mole) of 6-aminopenicillanic acid, 2.2 (0.022 mole) of triethylamine and 50 ml. of methylene chloride was stirred at room temperature for half an hour to obtain a clear solution. To the stirred 6-aminopenicillanic acid solution was added dropwise at 5° C. a solution of 2.6 g. (0.02 mole) of benzoylacetylene in 10 ml. of methylene chloride, and the mixture stirred at 10–20° C. for 42 hours. The reaction mixture was cooled at 5° C. and extracted three times with 30 ml. of cold water. The combined aqueous extracts were washed with 50 ml. of ether, covered with 100 ml. of ethyl acetate and acidified to pH 2.0 with dil. sulfuric acid below 5° C. under stirring. The aqueous layer was extracted with additional two 50-ml. portions of ethyl acetate. The combined organic solution was washed with two 20-ml. portions of cold water, dried over anhydrous sodium sulfate and filtered. To the filtrate was added 1 ml. of 39% sodium 2-ethylhexanoate solution in butanol. The resulting precipitate (0.78 g.) of the 6-aminopenicillanic acid derivative was collected by filtration and the filtrate was concentrated under reduced pressure below 40° C. Addition of n-hexane to the concentrate gave additional amount of the product. The total yield of sodium 6-(β-benzoylvinylamino)penicillanate was 1.95 g. (27%). M.P. 210–213° C. (dec.). MW=368.39.

*Analysis.*—Calcd. for $C_{17}H_{17}N_2O_4SNa \cdot H_2O$: C, 52.84; H, 4.96; N, 7.25. Found: C, 53.11, 53,28; H, 5.20, 5.25; N, 7.81, 7.56. It exhibited a $CD_{50}$ (*Staph. aureus* Smith, IM, mice) of 14 mg./kg. and inhibited *Staph. aureus* Smith at a concentration of 3.13 mcg./mg.

EXAMPLE 12

*Preparation of the sodium salt of 6-(β-o-chlorobenzoylvinylamino)penicillanic acid*

PART A

*o-Chlorobenzoyl chloride.*—Thionyl chloride (50 ml.) was added to 25 g. (0.16 mole) of o-chlorobenzoic acid and the mixture was heated under reflux for 1.5 hours. Excess thionyl chloride was distilled out and the residue was distilled under reduced pressure to give 27 g. (96.5%) of o-chlorobenzoyl chloride boiling at 117–118° C./22–33 mm.

*β-Chlorovinyl-o-chlorophenyl ketone.*—To a solution of 54 g. (0.30 mole) of o-chlorobenzoyl chloride in 250 ml. of dichloroethane was added dropwise a solution of 45 g. (0.34 mole) of anhydrous aluminum chloride in 50 ml. nitromethane and, at the same time, vinyl chloride gas was passed into the reaction mixture on external cooling. After two hours the mixture was poured on crushed ice and the dichloroethane layer was separated. The organic solution was boiled with 200 ml. of 10% sodium bicarbonate and then the solvent was removed. The residue was heated at 120–130° C. for one hour and distilled under reduced pressure. Fractional distillation gave 21.7 g. (35%) of β-chlorovinyl-o-chlorophenyl ketone boiling at 143–145° C./17 mm. The pure product solidified at room temperature. M.P. 44–45° C.

PART B

A solution of 10 g. (0.05 mole) of 6-aminopenicillanic acid and 10 g. (0.10 mole) of triethylamine in 100 ml. of dry methylene chloride was cooled below 10° C. and a solution of 10 g. (0.05 mole) of β-chlorovinyl-o-chlorophenyl ketone in 20 ml. of methylene chloride was added dropwise under stirring. After the mixture was stirred for 4 hours at 10–20° C., it was extracted three times with 50 ml. of cold water. The aqueous extracts were washed twice with 200 ml. of ether, then covered with 200 ml. of ethyl acetate and acidified to pH 2 with diluted sulfuric acid below 5° C. The aqueous layer was again extracted twice with 100 ml. of ethyl acetate, the organic layer was combined with the ethyl acetate extracts and dried over anhydrous sodium sulfate. The dried filtrate was mixed with 5 ml. of 36% SEH solution to give 0.7 g. of precipitate, which was collected by filtration, washed with ether and dried in vacuo. Concentration of the filtrate followed by addition of dry ether gave 7.3 g. of the product. The total yield of sodium 6-(β-o-chlorobenzoylvinylamino)penicillanate was 8.0 g. (40.5%), MW 402.84. The product inhibited *Staph. aureus* Smith at concentrations of 1.6–3.1 mcg./mg.

EXAMPLE 13

*Preparation of the sodium salt of 6-(β-p-chlorobenzoyl-vinylamino)penicillanic acid*

PART A

*p-Chlorobenzoyl chloride.*—A mixture of 500 g. (0.32 mole) of p-chlorobenzoic acid and 80 ml. of thionyl chloride was heated on a water bath for three hours to obtain a homogeneous solution. Excess thionyl chloride was evaporated and the residue was distilled to give 54 g. (96%) of β-chlorobenzoyl chloride boiling at 107–109° C./17 mm.

*β-Chlorovinyl-p-chlorophenyl ketone.*—To a solution of 52 g. (0.30 mole) of p-chlorobenzoyl chloride in 300 ml. of ethylene dichloride was added dropwise a solution of 47 g. (0.36 mole) of anhydrous aluminum chloride in 70 ml. of nitromethane, while at the same time vinyl chloride gas, prepared from 300 g. of dichloroethane and 300 g. of sodium hydroxide, was passed into a mixture. After two hours, the reaction mixture was poured into 500 g. of ice-water. The organic layer was separated, washed with 1 l. of 2.4% sodium bicarbonate solution and dried over anhydrous sodium sulfate. The solvent was evaporated to give crude β,β-dichloro-ethyl-p-chlorophenyl ketone, a part of which was crystallized from petroleum ether to obtain the pure substance melting at 82–83° C.

The crude dichloroethyl ketone was heated at 120° C. for half an hour and distilled under reduced pressure to give 18 g. (30%) of β-chlorovinyl-p-chlorophenyl ketone boiling at 115–117° C./1.0 mm., which solidified at room temperature. M.P. 50° C.

PART B

A mixture of 11 g. (0.05 mole) of 6-aminopenicillanic acid, 10 g. (0.10 mole) of triethylamine and 100 ml. of dry methylene chloride was stirred at room temperature for half an hour and then cooled below 5° C. A solution of 10 g. (0.05 mole) of β-chlorovinyl-p-chlorophenyl ketone in 20 ml. of dry methylene chloride was added dropwise at 0–5° C. to the stirred 6-aminopenicillanic acid solution. After the addition was completed, the mixture was stirred at 20° C. for 5 hours and extracted three times with 100 ml. of cold water containing a small amount of sodium bicarbonate. The aqueous extracts were washed twice with 200 ml. of ether, covered with 200 ml. of ethyl acetate and acidified to pH 2 at 5° C. with dil. hydrochloric acid under stirring. The aqueous phase was again extracted with 100 ml. of ethyl acetate. The combined organic layer was washed twice with 50 ml. of cold water, dried over anhydrous sodium sulfate and then calcium chloride. To the filtrate was added 5 ml. of 36% SEH solution and the mixture was concentrated to 20–30 ml. The concentrate was poured into 200 ml. of dry ether to give 5.0 g. (25%) of sodium 6-(β - p - chlorobenzoylvinylamino)penicillanate, M.W. 402.84. The product inhibited *Staph. aureus* Smith at concentrations of 3.1–12.5 mcg./mg. and exhibited a $CD_{50}$ (*S. aureus* Smith, IM, mice) of 9.1 mg./kg.

EXAMPLE 14

*Preparation of the sodium salt of 6-(β-o-bromobenzoyl-vinylamino)penicillanic acid*

PART A

*o-Bromobenzoic acid.*—A mixture of 100 g. (0.73 mole) of anthranilic acid and 50 ml. of conc. sulfuric acid was added in small portions to a stirred, cold solution of 55 g. of sodium nitrate in 400 ml. of water. The diazotized solution was added dropwise under stirring to cuprous bromide solution which was prepared by refluxing a mixture of 60 g. of copper powder, 20 ml. of bromine, 72 g. of sodium bromide and 40 ml. of 50% sulfuric acid. After the addition was completed, the mixture was stirred for three hours at room temperature. The precipitate which separated was collected by filtration and recrystallized from methanol-water. M.P. 145–148° C.

*o-Bromobenzoyl chloride.*—A mixture of 50.3 g. (0.25 mole) of o-bromobenzoic acid, 110 ml. of thionyl chloride and 90 ml. of benzene was heated under reflux for three hours. The reaction mixture was evaporated to remove the solvent and excess thionyl chloride, and the residue was distilled under reduced pressure to give 37 g. (68%) of o-bromobenzoyl chloride boiling at 99–103° C./6 mm.

*β - Chlorovinyl - o - bromophenyl ketone.*—There was added dropwise a solution of 11.5 g. of anhydrous aluminum chloride in 17 ml. of nitromethane to a stirred solution of 19 g. (0.086 mole) of o-bromobenzoyl chloride in 80 ml. of dichloroethane, while vinyl chloride gas, prepared from 100 g. of dichloroethane, was passed into the mixture at the same time. After the addition, the mixture was stirred at 20–40° C. for one hour and poured into 200 ml. of ice-water. The organic layer which separated was washed with 50 ml. of dil. sodium bicarbonate solution and dried over anhydrous sodium sulfate. The solvent was removed to give an oily residue, crude β,β-dichloroethyl-o-bromophenyl ketone containing a small amount of the acid chloride. The residue was dissolved in 80 ml. of dry ether and 5.5 ml. of triethylamine was added. The mixture was allowed to stand for three hours at room temperature and the precipitate which separated was removed by filtration. The solvent was evaporated and the residue was distilled under diminished pressure to give 3.17 g. (15%) of β-chlorovinyl-o-bromophenyl ketone boiling at 133–135° C./6 mm. which solidified at room temperature. M.P. 44–46° C.

PART B

A mixture of 2.8 g. (0.013 mole) of 6-aminopenicillanic acid, 2.5 g. (0.025 mole) of triethylamine and 30 ml. of dry methylene chloride was stirred at room temperature for half an hour and then cooled below 5° C. A solution of 2.95 g. (0.012 mole) of β-chlorovinyl-o-bromophenyl ketone in 15 ml. of dry methylene chloride was added dropwise at 0–5° C. to the stirred 6-aminopenicillanic acid solution. The mixture was stirred at room temperature for two hours and extracted twice with 40 ml. of cold water. The aqueous extracts were washed with 30 ml. of ether, covered with 40 ml. of ether and acidified to pH 2 below 5° C. with dil. sulfuric acid under stirring. The aqueous layer was again extracted with 30 ml. of ether. The ethereal layer was combined with the ether extracts, washed with 40 ml. of cold water and dried over calcium chloride. Addition of 3 ml. of 36% SEH solution to the dried filtrate gave 1.1 g. (21%) of sodium 6 - (β - o - bromobenzoylvinylamino)penicillanate, M.W. 447.91. The product inhibited *Staph. aureus* Smith at concentrations of 3.1–6.3 mcg./mg.

EXAMPLE 15

*Preparation of the sodium salt of 6-(β-p-nitrobenzoylvinyl-amino)penicillanic acid*

PART A

*p-Nitrobenzoyl chloride.*—A mixture of 51.5 g. (0.31 mole) nitrobenzoic acid and 100 ml. of thionyl chloride was heated under reflux for 3.5 hours. Excess thionyl chloride was removed and the residue was distilled under diminished pressure to give 52.8 g. (90%) of p-nitrobenzoyl chloride boiling at 155–158° C./20 mm., which solidified at room temperature. M.P. 72–75° C.

*β-Chlorovinyl-p-nitrophenyl ketone.*—To a stirred solution of 52.8 g. (0.285 mole) of p-nitrobenzoyl chloride in 285 ml. of dichloroethane was added dropwise a solution of 38 g. of anhydrous aluminum chloride in 50 ml. of nitromethane, while vinyl chloride gas was passed into the mixture. The gas was generated from 95 ml. of dichloroethane, 160 ml. of ethanol and 200 ml. of 50% sodium hydroxide solution. After two hours the reaction mixture was poured into ice-water. The dichloroethane solution which separated was boiled with 200 ml. of 10% sodium bicarbonate solution for 1.5 hours to remove the unreacted acid chloride. The organic solution was dried over calcium chloride and the solvent was removed to leave β,β-dichloroethyl-p-nitrophenyl ketone. The residue was dissolved in 320 ml. of ether and a solution of 29 g. of triethylamine in 140 ml. of ether was added dropwise under cooling. The precipitate which formed was removed by filtration and the filtrate was evaporated into dryness. The residue was crystallized from benzene-petr. ether to give 30 g. (49.5%) of β-chlorovinyl-p-nitrophenyl ketone. M.P. 80–81° C.

PART B

A mixture of 2.85 g. (0.013 mole) of 6-amino-penicillanic acid, 2.6 g. (0.026 mole) of triethylamine and 20 ml. of dry methylene chloride was stirred at room temperature for one hour. A solution of 2.76 g. (0.013 mole) of β-chlorovinyl-p-nitrophenyl ketone in 30 ml. of dry methylene chloride was added dropwise at 0° C. to the 6-aminopenicillanic acid solution. After the addition, the mixture was stirred for three hours at room temperature and then extracted twice with 50 ml. of cold water. The aqueous extracts, after washing with 50 ml. of ether, was covered with 50 ml. of ether and acidified to pH 2 with 35% sulfuric acid under stirring. The aqueous layer was again extracted twice with 50 ml. of ether and the ethereal layer was combined with the ethereal extracts. The combined ethereal solution was washed with 50 ml. of water, dried over calcium chloride and mixed with 3 ml. of 36% SEH solution to obtain 1.30 g. (25%) of sodium 6-(β-p-nitrobenzoylvinylamino) penicillanate. The product inhibited *Staph. aureus* Smith at a concentration of 3.2 mcg./mg.

EXAMPLE 16

*Preparation of the sodium salt of 6-(β-p-methoxybenzoylvinylamino)penicillanic acid*

PART A

*p-Methoxybenzoyl chloride.*—A mixture of 50 g. (0.325 mole) of p-methoxybenzoic acid and 90 ml. of thionyl chloride was heated under reflux for three hours. Excess thionyl chloride was removed and the residue was distilled under diminished pressure to give 51 g. (91%) of p-methoxybenzoyl chloride boiling at 128–130° C./15 mm.

*β-Chlorovinyl-p-methoxyphenyl ketone.*—To a stirred solution of 51 g. (0.30 mole) of p-methoxybenzoyl chloride in 300 ml. of dry dichloroethane was added dropwise a solution of 47 g. (0.36 mole) of anhydrous aluminum chloride in 70 ml. of nitromethane, while vinyl chloride gas, prepared from 300 ml. of dichloroethane, was passed into the mixture. The temperature of the reaction was kept at 20–25° C. by external cooling. After two hours, the reaction mixture was poured onto 500 g. of crushed ice. The organic layer which separated was washed with 1 l. of 2.4% sodium bicarbonate solution, dried over calcium chloride and evaporated into dryness to leave an oily product which was a mixture of β,β-dichloroethyl-p-methoxyphenyl ketone and β-chlorovinyl-p-methoxyphenyl ketone. The oily mixture was heated at 100° C. for half an hour and then distilled under diminished pressure to give 10 g. (17%) of β-chlorovinyl-p-methoxyphenyl ketone boiling at 115-135° C./0.5 mm., which solidified at room temperature and recrystallized from petr. ether. M.P. 48–50° C.

PART B

A mixture of 8 g. (0.037 mole) of 6-aminopenicillanic acid, 7.4 g. (0.074 mole) of triethylamine and 80 ml. of dry methylene chloride was stirred at room temperature for half and hour and cooled below 5° C. A solution of 7.2 g. (0.039 mole) of β-chlorovinyl-p-methoxyphenyl ketone in 20 ml. of dry methylene chloride was added dropwise to the stirred, cold 6-aminopenicillanic acid solution. Stirring was continued at room temperature for 4 hours and the reaction mixture was extracted three times with cold water containing a small amount of sodium bicarbonate (100 ml., 50 ml. and finally 50 ml.). The aqueous extracts were washed twice with 200 ml. of ether, covered with 100 ml. of ethyl acetate and acidified to pH 2 below 5° C. with hydrochloric acid under stirring. The aqueous layer was separated and again extracted twice with 50 ml. of ethyl acetate. The organic layer was combined with the ethyl acetate extracts, washed twice with 20 ml. of cold water and dried with anhydrous sodium sulfate and then calcium chloride. To the dried filtrate was added 3 ml. of 36% SEH solution and the mixture was concentrated to 20 ml. below 40° C. Addition of 200 ml. of dry ether to the concentrate gave 5.0 g. (35%) of sodium 6 - (β - p - methoxybenzoylvinylamino)penicillanate, MW 398.42. The product inhibits *Staph. aureus* Smith at a concentration of 6.3 mcg./mg.

EXAMPLE 17

*Preparation of the sodium salt of 6-(β-phenylacetylvinylamino)penicillanic acid*

PART A

*α-Phenylacetoacetonitrile.*—To a solution of 1.3 moles of sodium ethoxide and 350 ml. of absolute ethanol was added to mixture of 117 g. (1.0 mole) of benzyl cyanide and 132 g. (1.5 moles) of anhydrous ethyl acetate. The solution was refluxed for 3 hrs. and then allowed to stand overnight. Solid which separated was dissolved in 600 ml. of water. The solution was cooled and 45 ml. of acetic acid was added dropwise to the stirred, cold aqueous solution to give α-phenylacetoacetonitrile. Yield 105 g. (66%), M.P. 88–89° C.

*Benzyl methyl ketone.*—To 180 ml. of concentrated sulfuric acid was added 104 g. (0.65 mole) of α-phenylacetoacetonitrile with stirring and the mixture was heated for half an hour on a water bath. To the stirred solution was added 870 ml. of water below 30° C. and the mixture was heated under reflux for 2 hours. The liberated oil was extracted with two 300-ml. portions of ether and the combined ethereal solution was washed and dried over anhydrous sodium sulfate. After removing the solvent, the residue was distilled in vacuo to give 38.5 g. (49%) of benzyl methyl ketone. B.P. 109–111° C./24 mm.

*Benzyl hydroxymethylenemethyl ketones.*—To a dispersion of sodium (15 g.) in 350 ml. of dry benzene was added a mixture of 49 ml. of anhydrous ethyl formate and 55.6 g. (0.415 mole) of benzyl methyl ketone. The mixture was stirred for 5 hours at room temperature. Sodium salt of benzyl hydroxymethylene methyl ketone which separated was collected by filtration, dissolved in 100 ml. of water and washed three times with 100 ml. of ether. The aqueous layer was acidified to pH 2.0 and extracted twice with 150 ml. of ether. The combined ethereal extracts were washed with 200 ml. of water and dried over anhydrous sodium sulfate. After removing the solvent, the residue was dissolved in 100 ml. of 5% sodium hydroxide solution and then worked up as described above for purification. The residue was used for the following procedure without distillation. Yield 8.4 g. (13%).

*Benzyl α-chlorovinyl ketone.*—A solution of 10.3 g. (0.0635 mole) of benzyl hydroxymethylenemethyl ketone, 2 ml. of thionyl chloride and 45 ml. of dry benzene was refluxed for 6.5 hours. After removing excess thionyl chloride and benzene, the residue was distilled in vacuo. Benzyl-β-chlorovinyl ketone boiled at 98–105° C./7 mm. Yield 2.4 g. (22%).

PART B

A solution of 3.1 g. (0.018 mole) of benzyl-β-chlorovinyl ketone in 20 ml. of absolute methylene chloride was added dropwise to a stirred solution of 4 g. (0.018 mole) of 6-aminopenicillanic acid and 3.8 g. of triethylamine in 40 ml. of methylene chloride at 2–5° C. After stirring for 2.5 hours at room temperature, the mixture was extracted with three 80-ml. portions of water. The combined aqueous extracts were covered with 100 ml. of ether and acidified to pH 2. The ethereal layer was separated and the aqueous layer was extracted twice with 100 ml. of ethyl acetate. The organic layer was combined with the ethyl acetate extracts, washed with 100 ml. of water and dried with calcium chloride. Addition of 2 ml. of 3% SEH solution gave 1.1 g. (15%) of sodium 6-($\beta$-phenylacetylamino)penicillanate, MW 382.42. It exhibited a $CD_{50}$ (*Staph. aureus* Smith, IM, mice) of 12.5 mg./kg. and inhibited *Staph. aureus* Smith at concentrations of 0.4–0.8 mcg./mg.

EXAMPLE 18

*Preparation of the sodium salt of 6-[$\beta$-($\alpha$-phenoxypropionylvinylamino)]penicillanic acid*

PART A $\alpha$-Phenoxyethyl methyl ketone.—A mixture of 5.4 g. of magnesium turnings, 5 ml. of absolute ethanol and a few drops of dry carbon tetrachloride was heated for a short time on a water bath. After the reaction had proceeded for several minutes, 150 ml. of dry ether was added cautiously with stirring. A solution of 35 g. (0.22 mole) of diethyl malonate, 25 ml. of dry ether and 20 ml. of absolute ethanol was added with stirring at such a rate that rapid boiling was maintained. The mixture was heated under reflux on a water bath for 3 hours, at which time most of the magnesium had dissolved. To the gray solution was added 33 g. (0.18 mole) of $\alpha$-phenoxypropionyl chloride in 50 ml. of dry ether. After the reaction mixture was heated under reflux for an hour, a mixture of 15 ml. of concentrated sulfuric acid and 100 ml. of water was added. The water layer was extracted with two 50-ml. portions of ether and the combined ethereal solution was heated under reflux for 4 hours with a mixture of 60 ml. of acetic acid, 8 ml. of concentrated sulfuric acid and 40 ml. of water. The reaction mixture was neutralized with 210 ml. of 20% aqueous sodium hydroxide and extracted with three 100-ml. portions of ether. The organic extracts were dried over anhydrous sodium sulfate and distilled. B.P. 57–63° C./4 mm. Yield: 16 g. (55%).

$\alpha$-Phenoxyethyl hydroxy-methylenemethyl ketone.—To a chilled suspension of 2.3 g. of metallic sodium powder in 50 ml. of dry toluene, was added dropwise with stirring a solution of 16 g. (0.1 mole) of $\alpha$-phenoxyethyl methyl ketone and 7.4 g. (0.1 mole) of ethyl formate in 20 ml. of dry tetrahydrofuran. The mixture was stirred for 1.5 hours at room temperature and filtered. The filtrate was evaporated under reduced pressure. The resulting oil was dissolved in 50 ml. of water and the solution was washed with three 50-ml. portions of ether. The aqueous solution was acidified with 10% hydrochloric acid and extracted with three 50-ml. portions of ether. The combined ethereal solution was washed with 10 ml. of 5% aqueous sodium bicarbonate solution and dried over anhydrous sodium sulfate. Evaporation of the solvent gave 5 g. (26%) of the hydroxymethylene compound.

PART B

To a chilled solution of 1 g. (0.0052 mole) of $\alpha$-phenoxyethyl hydroxymethylenemethyl ketone and 0.6 g. (0.0059 mole) of triethylamine in 50 ml. of dry dioxane and 20 ml. of dry acetone was added dropwise with stirring 0.6 g. (0.0052 mole) of ethyl chloroformate in 20 ml. of dry dioxane. The mixture was stirred for 1 hour at 10° C. A solution of 1.3 g. (0.0052 mole) of 6-aminopenicillanic acid and 0.6 g. of triethylamine in 5 ml. of water was added and stirring was continued for another 1 hour at room temperature. There was added 50 ml. of 1% aqueous sodium bicarbonate solution to the reaction mixture, which was washed with three 50-ml. portions of ether. The aqueous layer was covered with 50 ml. of ethyl acetate, and acidified to pH 3 with 10% hydrochloric acid below 5° C. under vigorous stirring. The aqueous layer was extracted with two 50-ml. portions of ethyl acetate. The combined ethyl acetate solution was washed with two 20-ml. portions of cold water, dried over anhydrous sodium sulfate and 1 ml. of 39% SEH was added. The solution was concentrated under reduced pressure below 40° C. and the resulting oil was poured into 100 ml. of dry ether. Precipitated product was collected by filtration, washed with a small amount of ether and dried over phosphorous pentoxide in vacuo. Yield 0.43 g. (20%), MW 412.45. The sodium 6-[$\beta$-($\alpha$-phenoxypropionylvinylamino)]penicillanate exhibted a $CD_{50}$ (*Staph. aureus* Smith, IM, mice) of 10.5 mg./kg. and inhibited *Staph. aureus* Smith at concentrations of 1.6–3.1 mcg./mg.

EXAMPLE 19

*Preparation of the sodium salt of 6-($\beta$-furoylvinylamino)-penicillanic acid*

Furoyl chloride.—A mixture of 75 g. (0.67 mole) of furoic acid, 70 ml. of thionyl chloride and 50 ml. of benzene was heated on a water bath for three hours. Excess thionyl chloride and the solvent were evaporated and the residue was distilled under reduced pressure to give 55 g. (63%) of furoyl chloride boiling at 72–74° C./18 mm.

$\beta$-Chlorovinyl furyl ketone.—To a stirred solution of 55 g. (0.42 mole) of furoyl chloride in 400 ml. of dichloroethane was added dropwise a solution of 67 g. (0.48 mole) of anhydrous aluminum chloride in 100 ml. of nitromethane, while at the same time vinyl chloride gas, prepared from 400 ml. of dichloroethane and 400 g. of sodium hydroxide, was passed for two hours into the stirred mixture. The temperature of the reaction was kept at 20–25° C. by external cooling. The reaction mixture was poured into 500 ml. of ice-water. The organic layer was separated, washed thoroughly with 1 l. of dil. sodium bicarbonate solution and dried over anhydrous sodium sulfate. Evaporation of the solvent gave crude $\beta,\beta$-dichloroethyl furyl ketone, which was heated at 100–110° C. for 15 minutes and distilled at 105° C./27 mm. The distillate which solidified at room temperature was crystallized from petroleum ether to give 5 g. (7.6%) of $\beta$-chlorovinyl furyl ketone. M.P. 54–56° C.

PART B

A mixture of 6.2 g. (0.029 mole) of 6-amino-penicillanic acid, 5.8 g. (0.058 mole) of triethylamine and 60 ml. of dry methylene chloride was stirred at room temperature until almost all precipitate went into the solution. The 6-aminopenicillanic acid solution was cooled below 5° C. and a solution of 4.5 g. (0.029 mole) of $\beta$-chlorovinyl furyl ketone in 10 ml. of dry methylene chloride was added under stirring. The mixture was stirred at room temperature for 4 hours. The reaction mixture, the color of which turned to dark brown during the agitation, was extracted three times with cold water containing a small amount of sodium bicarbonate (100 ml., 50 ml. and finally 50 ml.). The aqueous extracts were washed twice with 200 ml. of ether, covered with 100 ml. of ethyl acetate and acidified to pH 2 below 5° C. with dil. hydrochloric acid under vigorous agitation. The aqueous layer was again extracted twice with 50 ml. of ethyl acetate. The organic layer which was combined with the ethyl acetate extracts was washed with 50 ml. of cold water, dried over anhydrous sodium sulfate and then calcium chloride. The filtrate was mixed with 3 ml. of 36% SEH soultion and the mixture was concentrated to about 30 ml. to separate 3.2 g. (31%) of sodium 6-($\beta$-furoylvinylamino)-penicillanate. The supernatant was poured into 200 ml. of dry ether to give an additional amount of the product, MW 358.35. The product inhibits *Staph. aureus* Smith at a concentration of 12.5 mcg./mg.

EXAMPLE 20

*Preparation of the sodium salt of 6-[β-(2-theonyl)vinylamino]penicillanic acid*

PART A

*N-methylformanilide.*—A mixture of 321 g. (3 moles) of methylaniline, 300 g. of formic acid (90%), and 1.8 l. of toluene was distilled slowly through a 50-cm. column to remove azeotropically water produced during the reaction. The initial temperature of the vapor was 87–88° C. When the water had been removed, the temperature rose to 108–110° C. The distillation was continued until approximately 1.5 l. of toluene had been collected (about 9 hours). The residue was then transferred to a Claisen flask and distilled under reduced pressure, the portion boiling at 111–113.5° C./6.5–7 mm. being collected. The yield was 388 g. (95.8%).

*2-thenaldehyde.*—A mixture of 270 g. (2.0 moles) of N-methylformanilide and 309 g. (2.0 moles) of phosphorous oxychloride was allowed to stand for 30 minutes at 40–45° C., and then the mixture was stirred at 25–35° C. To the solution was added 184.8 g. (2.2 moles) of thiophene at such a rate that the temperature was maintained at 25–35° C. After the addition was completed, the reaction mixture was stirred for 2 hours at the same temperature and then allowed to stand at room temperature for 15 hours. The dark, viscous solution was poured into a vigorously stirred mixture of 800 g. of crushed ice and 500 ml. of water. The aqueous layer was separated and extracted with three 600-ml. portions of ether. The ether extracts were combined with the organic layer and washed twice with 400 ml. of dilute hydrochloric acid (1:8) to remove all traces of N-methylaniline. The aqueous washings were in turn extracted with 400 ml. of ether; and the ether extract was combined to the ethereal solution. The solution was washed with two 400-ml. portions of saturated sodium bicarbonate solution, then with 200 ml. of water; and dried over anhydrous sodium sulfate. The yellow oil obtained by evaporating the ethereal solution was distilled through a column to give 2-thenaldehyde boiling at 91° C./22 mm. Yield 72 g. (32.1%).

*2-thienylethinylcarbinol.*—To 1000 ml. of liquid ammonia there was added 14.5 g. of small pieces of metallic sodium with stirring and cooling while acetylene was entered rapidly. To the mixture was added a solution of 70 g. (0.63 mole) of 2-thenaldehyde in 100 ml. of dry ether during an hour, and the mixture stirred and cooled for further 2 hours with continuous introduction of acetylene. The ammonia was allowed to evaporate overnight, and ether and dil. sulfuric acid were added to the residue. The ethereal layer was separarted, washed with water then dried with sodium sulfate. The distillation under reduced pressure gave 62.5 g. (73%) of thienylethinylcarbinol. B.P. 95–100° C./2 mm.

*2-thenoylacetylene.*—To a stirred solution of 54.5 g. (0.395 mole) of 2-thienylethinylcarbinol in 85 ml. of acetone was slowly added a mixture of 30 g. of chromium trioxide, 85 ml. of water and 25 ml. of conc. sulfuric acid at 5° C. during 2 hours. After stirring for further 30 minutes, the mixture was diluted with ice and water to give a precipitate of the product. This crude ketone was crystallized from aqueous methanol to give 2-thenoylacetylene. Yield 42 g. (78%). M.P. 32–33° C.

PART B

To a mixture of 4.3 g. (0.02 mole) of 6-aminopenicillanic acid, 2.1 g. (0.021 mole) of triethylamine and 40 ml. of absolute methylene chloride was slowly added a solution of 2.7 g. (0.02 mole) of 2-thenoylacetylene in 10 ml. of absolute methylene chloride at 5° C. with stirring. After stirring for 20 hours in 10–20° C., the reaction mixture was extracted with five 50-ml. portions of aqueous sodium bicarbonate solution and the combined extracts were washed twice with 50 ml. of ether, covered with 50 ml. of cold ethyl acetate and acidified with dil. sulfuric acid under cooling. The aqueous layer was extracted with additional 50 ml. of ethyl acetate. The combined organic layer was washed with 50 ml. of cold water, dried with anhydrous sodium sulfate and then calcium chloride. To the filtrate was added 6 ml. of 35% SEH solution and the mixture was concentrated to about 50 ml. below 40° C. To the concentrate was added about 100 ml. of n-hexane to afford the precipitate, which was filtered and dried in vacuo. Yield 1.05 g. (14%). M.P. 208–210° C. (dec.), MW 374,43.

*Analysis.*—Calcd. for $C_{15}H_{15}N_2O_4S_2Na \cdot \frac{1}{2} H_2O$: C, 46.98; H, 4.21; N, 7.31. Found: C, 47.49, 47.65; H, 4.97, 4.46; N, 6.12, 6.10. The sodium thenoylvinylamino penicillanate inhibited *Staph. aureus* Smith in a concentration 12.5 mcg./mg.

Alternatively, the product may be prepared as follows:

PART A

*2-acetylthiophene.*—A stirred mixture of 168 g. (2.0 moles) of thiophene and 15 g. (2.0 moles) of acetyl chloride in 2 l. of dry benzene was cooled to 0° C. and 520 g. (2.0 moles) of freshly distilled stannic chloride was added dropwise at 0–10° C. over a period of 40–60 minutes. The mixture was stirred at room temperature for 1.5 hours, during which the color of the solution turned to reddish brown and then crystals separated. To the reaction mixture was added slowly 1 l. of dil. hydrochloric acid (1:9) to decompose the crystalline complex. The aqueous layer was washed with 300 ml. of benzene and the benzene layer which was combined with the washings was washed with 250 ml. of water and dried over calcium chloride. The solvent was removed and the residue was distilled under reduced pressure to give 224.5 g. (89%) of 2-acetylthiophene boiling at 115–115.5° C./34–35 mm.

*Thiophene-2-carboxylic acid.*—2-acetylthiophene (31.5 g., 0.25 mole) was added dropwise under stirring at 30–45° C. to sodium hypochlorite solution which was prepared from 80 g. (2.0 moles) of sodium hydroxide in 750 ml. of water and 57.5 g. of chlorine. After the addition was completed, the mixture was stirred at the same temperature for one hour. Excess hypochlorite was decomposed by adding 5 g. of sodium bisulphite and the reaction mixture was filtered. The filtrate was acidified with conc. hydrochloric acid to yield 30 g. (94%) of thiophene-2-carboxylic acid. M.P. 128–129° C.

*Thiophene-2-carbonyl chloride.*—A mixture of 30 g. (0.234 mole) and 50 ml. of thionyl chloride was heated under reflux for 4 hours. Excess thionyl chloride was removed and the residue was distilled under reduced pressure to give 32.6 g. (95%) of thiophene-2-carbonyl chloride boiling at 105° C./30 mm.

*β-Chlorovinyl thienyl ketone.*—To a stirred solution of 14.7 g. (0.1 mole) of thenoyl chloride in 100 ml. of dichloroethane was added dropwise a solution of 16 g. of anhydrous aluminum chloride in 15 ml. of nitromethane, while vinyl chloride gas was passed through the reaction mixture for one hour. The reaction mixture was poured into 1 l. of ice-water. The dichloroethane layer was separated off and dried with calcium chloride. The solvent was evaporated to give crude β,β-dichloroethyl thienyl ketone, which was converted by distillation into β-chlorovinyl thienyl ketone. Yield 2 g. (12%), B.P. 115–117° C./7 mm.

PART B

*Sodium 6-(β-thenoylvinylamino)penicillanate.*—A mixture of 2.84 g. (0.013 mole) of 6-aminopenicillanic acid, 3.6 ml. of triethylamine and 30 ml. of dry methylene chloride was stirred at room temperature for one hour to obtain an almost clear solution and then cooled below 5° C. A solution of 2.25 g. (0.013 mole) of β-chlorovinyl thienyl ketone in 15 ml. of dry methylene chloride was added dropwise to the 6-aminopenicillanic acid solution and the mixture was stirred at room temperature for three hours. The reaction mixture was extracted twice with 50 ml. of cold water. The combined aqueous extracts were washed with 50 ml. of ethyl acetate and acidified to pH 2 below 5° C. with 35% sulfuric acid under stirring. The aqueous layer was again extracted with 30 ml. of ethyl acetate and the organic layer, combined with ethyl acetate extracts, was washed with 50 ml. of cold water, dried with calcium chloride and mixed with 2 ml. of 36% SEH solution to yield 1.42 g. (30%) of sodium 6-(β-thenoylvinylamino)penicillanate.

EXAMPLE 21

*Preparation of the sodium salt of 6-[β-(5-methyl-3-phenyl-4-isoxazoyl)vinylamino]penicillanic acid*

PART A

*5 - methyl - 3 - phenylisoxazole-4-carbonyl chloride.*—A mixture of 178 g. (0.88 mole) of 5-methyl-3-phenyl-isoxazole-4-carboxylic acid and 200 ml. of thionyl chloride was heated under reflux for three hours. Excess thionyl chloride was removed from the reaction mixture and the residue was distilled to give 177 g. (91%) of 5-methyl-3-phenylisoxazole-4-carbonyl chloride boiling at 115–117° C./3 mm.

*4 - acetyl - 5 - methyl-3-phenylisoxazole.*—A mixture of 13.4 g. of magnesium turnings, 15 ml. of absolute alcohol and 1.5 ml. of carbon tetrachloride was warmed on a water bath. After several minutes, 200 ml. of dry ethanol was added under stirring at such a rate that gentle boiling was maintained. A mixture of 88 g. (0.55 mole) of diethyl malonate, 50 ml. of absolute ethanol and 65 ml. of dry ether was added dropwise at such a rate to maintain rapid boiling. The mixture was heated under reflux on a water bath for two hours, during which time most of the magnesium dissolved. To the reaction mixture was added dropwise a solution of 111 g. (0.5 mole) of 5-methyl-3-phenylisoxazole-4-carbonyl chloride in 100 ml. of dry ether over a period of 30 minutes. The mixture was refluxed for half an hour, then cooled below 10° C. and 159 ml. of dilute sulfuric acid (1:9) was added. The aqueous layer was extracted with two 100-ml. portions of ether. The ethereal layer which was combined with the ethereal extracts was washed with 100 ml. of water and then the solvent was removed. To the residual oil (diethyl 5-methyl-3-phenyl-4-isoxazoylmalonate) was added a mixture of 150 ml. of acetic acid, 20 ml. of conc. sulfuric acid and 100 ml. of water and the mixture was heated under reflux for 16 hours. The reaction mixture was chilled, neutralized with 20% sodium hydroxide solution was chilled, neutralized with 20% sodium hydroxide solution and extracted with three 200-ml. portions of ether. The extracts were washed with 200 ml. of water, dried over anhydrous sodium sulfate and evaporated into dryness to give 100.0 g. (100%) of 4-acetyl-5-methyl-3-phenylisoxazole melting at 53–56° C. Recrystallization from 75% aqueous ethanol gave colorless needles melting at 56–58° C.

*Hydroxymethylenemethyl - 5 - methyl - 3 - phenyl - 4-isoxazolyl ketone.*—There was added 3.5 g. of sodium to 50 ml. of absolute ethanol and the resulting sodium ethoxide solution was evaporated to remove most of the solvent. The residue was suspended in 100 ml. of dry benzene and a solution of 30 g. (0.15 mole) of 5-methyl-4-acetyl-3-phenylisoxazole and 11.1 g. (0.15 mole) of ethyl formate in 50 ml. of dry benzene was added dropwise at room temperature under stirring. Heat evolution was not observed and the color of the solution gradually turned to reddish brown. After three hours stirring, the reaction mixture was concentrated to about ½ volume to deposit a slightly yellowish brown precipitate, the sodium salt of the hydroxymethylenemethyl ketone, which was collected by filtration and washed with 50 ml. of benzene. The filtrate and washings were extracted twice with 100 ml. of water and the sodium salt was dissolved in the aqueous extracts. The aqueous solution was washed three times with 100 ml. of ether, acidified to pH 2 with hydrochloric acid and extracted three times with 100 ml. of ether. The combined extracts were dried with anhydrous sodium sulfate and filtered. The filtrate was evaporated in vacuum to dryness to leave 22 g. (65%) of the yellow orange oily product.

PART B

To a stirred mixture of 11 g. (0.048 mole) of hydroxymethylenemethyl - 5 - methyl-3-phenyl-4-isoxazolyl ketone and 5 g. (0.05 mole) of triethylamine in 80 ml. of dry tetrahydrofuran was added dropwise a solution of 4.3 g. (0.04 mole) of ethyl chloroformate in 20 ml. of dry tetrahydrofuran at about 0° C. The mixture was stirred at 10–15° C. for half an hour and then chilled below 0° C. A cold solution of 8.65 g. (0.04 mole) of 6-aminopenicillanic acid and 4 g. (0.04 mole) of triethylamine in 12 ml. of water was added in one portion to the mixed anhydride solution, the mixture being stirred for several minutes below 0° C. and for one hour at room temperature. The reaction mixture was mixed with 200 ml. of water containing 3.4 g. (0.04 mole) of sodium bicarbonate and washed three times with 100 ml. of ether. The reddish-orange aqueous solution was cooled below 5° C., covered with 200 ml. of ethyl acetate and acidified to pH 2 with dil. sulfuric acid under vigorous stirring. The aqueous phase was again extracted twice with 100 ml. of ethyl acetate. The organic phase was combined with the extracts, washed with 100 ml. of cold water and dried over sodium sulfate. To the dried ethyl acetate solution was added 14 ml. of 39% SEH solution and the mixture was concentrated to about 50 ml. The concentrate was poured into 500 ml. petroleum ether to give 13 g. (72%) of yellow precipitate. A part of the product (10 g.) was dissolved in 100 ml. of water and treated with 2 g. of active carbon. The filtrate was worked up by the same procedure as described above and 6.3 g. of yellow powder obtained. The powder was sodium 6-[β-(5-methyl-3-phenyl - 4 - isoxazoyl)vinylamino]penicillanate. It had a MW of 449.46 and inhibited *Staph. aureus* Smith at a concentration of 6.3 mcg./mg.

*Starting materials*

As illustrated above, 6-(β-acylvinylamino)penicillanic acids of the present invention are prepared by the reaction of 6-aminopenicillanic acid with an appropriately substituted acylvinyl chloride, acylacetylene or β-hydroxyvinyl ketone. These three classes of starting materials are prepared, in turn, from known β-acylvinyl chlorides, aldehydes and methyl ketones, respectively, as exemplified above and discussed below.

*Preparation of β-hydroxyvinylketones*

β - Hydroxyvinylketones are prepared from methyl ketones and ethyl formate according to the procedure of Kochetkov et al., J. Gen. Chem. USSR 28: 3053–3055, 1958. The following example is a representative preparation.

*Benzyl β-hydroxyvinyl ketone.*—To a dispersed sodium (15 g.; 0.065 atom) in 350 ml. of dry benzene was added a mixture of 49 ml. of anhydrous ethyl formate and 55.6 g. (0.415 mole) of benzyl methyl ketone. (Julian et al., Org. Syn. Coll., vol. 2: 391–393, 1943.) The mixture was stirred for 5 hours at room temperature. Sodium salt of benzyl hydroxyvinyl ketone which separated was collected by filtration, dissolved in 100 ml. of water and washed three times with 100 ml. of ether. The aqueous layer was acidified to pH 2.0 and extracted twice with 150 ml. of ether. The combined ethereal extracts were washed with 200 ml. of water and dried over anhydrous sodium sulfate. After evaporating the solvent, the residue was dissolved in 100 ml. of 5% sodium hydroxide solution. The alkaline solution was repeatedly worked up as described above for purification. The yield was 8.4 g. (13%) of benzyl β-hydroxyvinyl ketone. $\nu C=O$(chelated)$^{1600\ cm.-1}$.

β-Hydroxyvinyl α-phenoxyethyl ketone (yield 26%), β-droxyvinyl 2,6-dimethoxyphenyl ketone (yield 7%) and β - hydroxyvinyl 5-methyl-3-phenyl-4-isoxazolyl ketone (yield 65%) were also obtained by the same procedure. Trifluoroacetylacetone, 2-thenoyltrifluoroacetone and 2-furoyltrifluoroacetone are commercially available.

Preparation of β-acylvinyl chlorides

Three general methods are particularly useful for the synthesis of β-acylvinyl chlorides. Method (1) is the procedure reported by Benson and Pohlan, J. Org. Chem. 29 (2): 385-391, February 1964, which involves the reaction of acyl chlorides with acetylene gas in the presence of aluminum chloride and is used for the preparation of the alkyl derivatives. Method (2) is based on the procedure of Klimko et al. J. Gen. Chem. USSR, 27: 415-419, 1957, which requires the reaction of acyl chlorides with vinyl chloride in the presence of aluminum chloride and is used for the preparation of the aryl derivatives. Method (3) is the procedure described by Kochetkov et al., J. Gen. Chem. USSR, 28: 3053-3055, 1958, which is accomplished by the chlorination of β-hydroxyvinyl ketones with thionyl chloride. There is given below a representative preparation for each of the three methods used.

(1) *β-Valerylvinyl chloride.*—To a cold suspension of 44 g. (0.33 mole) of anhydrous aluminum chloride in 150 ml. of carbon tetrachloride was added dropwise 36 g. (0.3 mole) of n-valeryl chloride under stirring. Acetylene gas was bubbled into the mixture at room temperature for three hours. The reaction mixture was poured into ice-water and extracted three times with 100 ml. of ether. The ethereal extracts were washed with 50 ml. of saturated solution of sodium chloride, dried over anhydrous sodium sulfate and distilled under diminished pressure to give 25 g. (57%) of β-valerylvinyl chloride, B.P. 88–90° C./21 mm.

(2) *β-(o-Chlorophenyl)vinyl chloride.*—To a solution of 54 g. (0.30 mole) of o-chlorobenzoyl chloride in 250 ml. of dichloriethane was added dropwise a solution of 45 g. (0.34 mole) of anhydrous aluminum chloride in 50 ml. of nitromethane, while to the mixture was passed vinyl chloride gas which generated from 100 ml. of dichloroethane, 160 ml. of ethanol and 200 ml. of 50% sodium hydroxide solution. After two hours the mixture was poured on crushed ice and the dichloroethane layer was separated. The organic solution was boiled with 200 ml. of 10% sodium bicarbonate and then the solvent was evaporated. The residue (β,β-dichloroethyl ketone) was heated at 120–130° C. for one hour and distilled under reduced pressure. Fractional distillation gave 21.7 g. (35%) of β-(o-chlorophenyl)vinyl chloride boiling at 143–145° C./17 mm., which solidified at room temperature, M.P. 44–45° C.

$\tau_{max.}^{CCl_4}$ (p.p.m.) 3.43 (d), 3.15 (d) (AB type, $J_{ab}=13$ c.p.s.

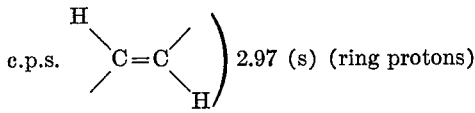 2.97 (s) (ring protons)

*Analysis.*—Calcd. for $C_9H_6Cl_2O$: C, 53.76; H, 3.01. Found: C, 54.13, 53.89; H, 3.07, 3.02.

(3) *β-Phenylacetylvinyl chloride.*—A solution of 10.3 g. (0.064 mole) of benzyl β-hydroxyvinyl ketone, 2 ml. of thionyl chloride and 45 ml. of dry benzene was refluxed for 6.5 hours. The solvent and excess thionyl chloride being removed, the residue was distilled in vacuo. β-Phenylacetylvinyl chloride boiled at 98–105° C./7 mm. Yield 2.4 g. (22%).

Preparation of acylacetylenes

According to the procedure of Jones and McCombie, J. Chem. Soc. 1942: 733–735, 1942, aldehydes are combined with acetylene in the presence of sodium amide. The resulting ethinyl alcohols are oxidized with chromic oxide to give acylacetylenes by the method of Bowden et al., J. Chem. Soc. 1946 (1): 39–45, January 1946.

Representative examples of the preparation of acylacetylenes are given below.

*Phenylethinylcarbinol.*—Acetylene gas was passed into 1000 ml. of liquid ammonia with stirring, while 23 g. (1 atom) of sodium was added slowly in 1 g. portions. A solution of 106 g. (1 mole) of benzaldehyde in 100 ml. of dry ether was added over a period of one hour and the mixture was stirred and cooled for two hours with continued introduction of acetylene. The reaction mixture was allowed to stand overnight to evaporate the ammonia and to the residue was added dil. sulfuric acid containing ice. The aqueous solution was extracted with ether, the extracts being dried and evaporated. The residual oil was distilled under diminished pressure to give 98 g. (74%) of phenylethinylcarbinol boiling at 125–127° C./18 mm. (lit. Jones and McCombie, J. Chem. Soc., 1942: 733–735, 1942, B.P. 115–116° C./16 mm.). $\nu_{OH}$ 3320 cm.$^{-1}$ $\nu_{\equiv C-H}$ 3240 cm.$^{-1}$, $\nu_{C\equiv C}$ 2120 cm.$^{-1}$.

Isopropylethinylcarbinol (yield 64%, B.P. 132–134° C., $\nu_{max.}$ 3320, 3260, 2120 cm.$^{-1}$) and 2-thienylethinylcarbinol (yield 73%, B.P. 95–100° C./2 mm., $\nu_{max.}$ 3320, 3280, 2160 cm.$^{-1}$) were also prepared by the same procedure.

*Benzoylacetylene.*—To a solution of 98 g. (0.74 mole) of phenylethinylcarbinol in 200 ml. of acetone was added dropwise a solution of 50 g. chromium trioxide in 150 ml. of water containing 43 ml. of conc. sulfuric acid. The temperature was kept below 10° C. during the addition. After the addition was completed, the mixture was stirred at room temperature for 2 hours, then poured into 1 kg. of crushed ice. The precipitate which separated was collected by filtration and washed with water. Recrystallization from water-ethanol gave pale yellow needles melting at 47–48° C. Yield 80%. $\nu_{\equiv C-H}$ 3200 cm.$^{-1}$, $\nu_{C\equiv C}$ 2100 cm.$^{-1}$, $\nu_{C=O}$ 1640 cm.$^{-1}$.

$$\lambda_{max.}^{EtOH} 264\ m\mu\ (\epsilon\ 12{,}700)$$

(lit. Bowden et al., J. Chem. Soc. 1946 (1): 39–45, January 1946, M.P. 50–51° C., $$\lambda_{max.}^{EtOH} 264.5\ m\mu)$$

Isobutyrylacetylene (yield 65%, B.P 45–46° C./42 mm., $\nu_{max.}$ 3260, 2120, 1670 cm.$^{-1}$) and 2-thenoylacetylene (yeld 78%, M.P. 32–33° C., $\nu_{max.}$ 3200, 2100, 1618 cm.$^{-1}$) were prepared by the same procedure.

Preferred embodiments of the present invention are the acids (and the nontoxic, pharmaceutically acceptable salts thereof) of the formula

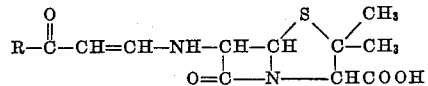

in which R represents (lower)alkyl or one of the radicals having the formulae

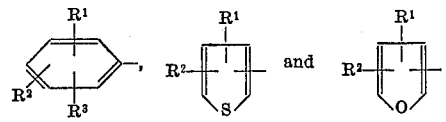

wherein $R^1$, $R^2$ and $R^3$ are each hydrogen, (lower)alkyl, trifluoromethyl, fluoro, chloro, bromo, iodo, (lower)alkoxy, methylsulfonyl or nitro.

What is claimed is:
1. A member selected from the group consisting of the compounds of the formulae

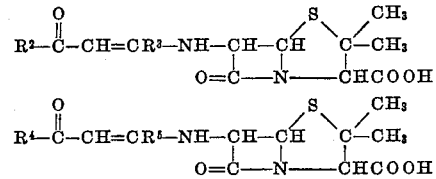

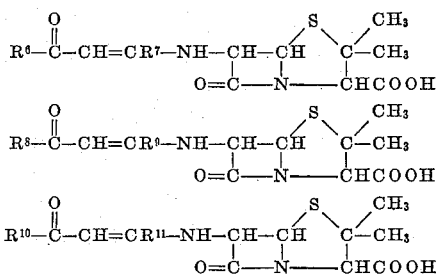

and pharmaceutically acceptable salts thereof wherein $R^2$ represents (lower)alkyl; $R^3$ represents a member selected from the group consisting of hydrogen and (lower)alkyl; $R^4$ represents halo(lower) alkyl; $R^5$ represents a member selected from the group consisting of hydrogen, (lower)alkyl, thienyl and furyl; $R^6$ represents carboalkoxy; $R^7$ represents a member selected from the group consisting of hydrogen and (lower)alkyl; $R^8$ represents a member selected from the group consisting of phenyl, o-chlorophenyl, p-chlorophenyl, o-bromophenyl, p-nitrophenyl, p-methoxyphenyl, benzyl and phenoxyethyl; $R^9$ represents a member selected from the group consisting of hydrogen and (lower)alkyl; $R^{10}$ represents a member selected from the group consisting of thienyl and furyl and $R^{11}$ represents a member selected from the group consisting of hydrogen and (lower)alkyl.

2. A member selected from the group consisting of the compounds of the formulae

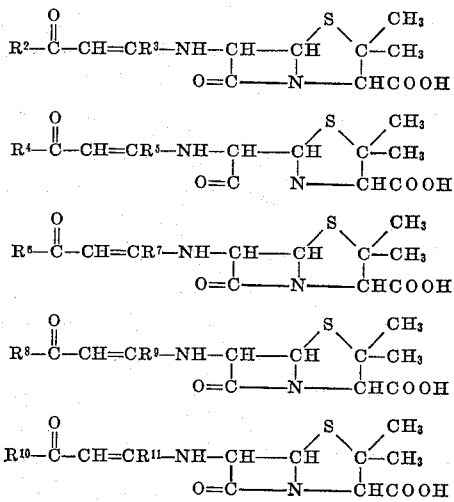

and pharmaceutically acceptable nontoxic salts thereof wherein $R^2$ represents a member selected from the group consisting of methyl, ethyl, propyl, isopropyl, butyl, isobutyl, amyl and nonyl; $R^3$ represents hydrogen; $R^4$ represents a member selected from the group consisting of chloromethyl, chloroethyl and trifluoromethyl; $R^5$ represents a member selected from the group consisting of hydrogen, methyl, thienyl and furyl; $R^6$ represents carbomethoxyethyl; $R^7$ represents hydrogen; $R^8$ represents a member selected from the group consisting of phenyl, o-chlorophenyl, p-chlorophenyl, o-bromophenyl, p-nitrophenyl, p-methoxyphenyl, benzyl and phenoxyethyl; $R^9$ represents hydrogen; $R^{10}$ represents a member selected from the group consisting of thienyl, furyl and 5-methyl-3-phenyl-4-isoxazolyl; and $R^{11}$ represents hydrogen.

3. A compound as defined in claim 2 having the formula

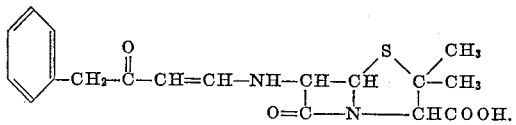

4. A compound as defined in claim 2 having the formula

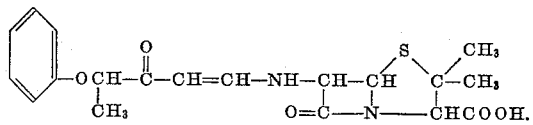

5. The acids of the formula

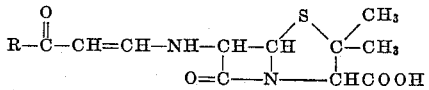

in which R represents (lower)alkyl or one of the radicals having the formulae

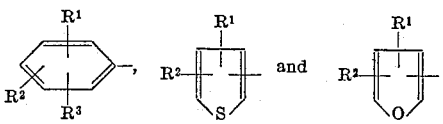

wherein $R^1$, $R^2$ and $R^3$ are each hydrogen, (lower)alkyl, trifluoromethyl, fluoro, chloro, bromo, iodo, (lower)alkoxy, methylsulfonyl or nitro; and nontoxic, pharmaceutically acceptable salts thereof.

No references cited.

NICHOLAS S. RIZZO, *Primary Examiner.*